US007133630B2

(12) United States Patent
Sakai

(10) Patent No.: US 7,133,630 B2
(45) Date of Patent: Nov. 7, 2006

(54) BELT DEVICE, IMAGE FORMING APPARATUS, AND METHOD TO CONTROL BELT SPEED

(75) Inventor: Yoshihiro Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 10/901,238

(22) Filed: Jul. 29, 2004

(65) Prior Publication Data

US 2005/0025524 A1 Feb. 3, 2005

(30) Foreign Application Priority Data

Jul. 29, 2003 (JP) ............................ 2003-203280
May 6, 2004 (JP) ............................ 2004-137353

(51) Int. Cl.
*G03G 15/01* (2006.01)
*G03G 15/00* (2006.01)
*B41J 2/385* (2006.01)
*G01D 15/06* (2006.01)

(52) U.S. Cl. ...................... 399/301; 399/162; 399/167; 347/116

(58) Field of Classification Search ................ 399/162, 399/167, 301; 347/116; 430/44; 198/804, 198/810.02, 810.03
See application file for complete search history.

(56) References Cited

U.S. PATENT DOCUMENTS 4,485,982 A * 12/1984 St. John et al. ......... 347/116 X
4,655,579 A 4/1987 Adachi et al.
4,662,739 A 5/1987 Sakai et al.
4,664,501 A 5/1987 Koizumi et al.
4,690,541 A 9/1987 Sakai et al.
4,690,542 A 9/1987 Furuta et al.
4,717,965 A 1/1988 Mashiko et al.
4,742,371 A 5/1988 Furuta et al.
4,746,950 A 5/1988 Mamizuka et al.
4,750,017 A 6/1988 Sakai
4,796,050 A 1/1989 Furuta et al.
4,912,491 A * 3/1990 Hoshino et al. ............ 347/116
4,922,301 A 5/1990 Katoh et al.
4,933,727 A 6/1990 Mizuma et al.
5,121,170 A 6/1992 Bannai et al.
5,160,969 A 11/1992 Mizuma et al.
5,266,976 A * 11/1993 Ohigashi et al. ............ 347/116
5,819,143 A 10/1998 Sakai et al.
5,926,670 A 7/1999 Furuta et al.
5,937,232 A 8/1999 Taguchi et al.
6,038,423 A * 3/2000 Tagawa et al. ............. 399/301
6,057,869 A 5/2000 Kawaishi et al.
6,336,019 B1 * 1/2002 Castelli et al. .............. 399/162
2002/0186426 A1 12/2002 Sakai (Continued)

FOREIGN PATENT DOCUMENTS

JP 11-24507 1/1999

*Primary Examiner*—Sandra L. Brase
(74) *Attorney, Agent, or Firm*—Oblon, Spivak, McClelland, Maier & Neustadt, P.C.

(57) ABSTRACT

A belt device includes a belt as an endless belt that has a scale with a large number of scale marks formed along the whole circumference of the belt. A sensor reads the scale to obtain scale information. A control device provides control to correct a belt speed, based on scale information read. A scale-mark degradation determining unit determines whether the scale mark is degraded. A belt drive controller continuously provides control to correct the belt speed for a degraded portion until the scale-mark degradation determining unit determines that there is no degradation.

9 Claims, 12 Drawing Sheets

U.S. PATENT DOCUMENTS

2003/0052957 A1* 3/2003 Yamada et al. ............. 347/116
2003/0053818 A1 3/2003 Kimura

* cited by examiner

BELT DEVICE, IMAGE FORMING APPARATUS, AND METHOD TO CONTROL BELT SPEED

CROSS-REFERENCE TO RELATED APPLICATIONS

The present document incorporates by reference the entire contents of Japanese priority documents, 2003-203280 filed in Japan on Jul. 29, 2003 and 2004-137353 filed in Japan on May 6, 2004.

BACKGROUND OF THE INVENTION

1) Field of the Invention

The present invention relates to a belt device that detects an actual belt speed and corrects a belt speed based on the actual belt speed, an image forming apparatus including the belt device, and a method to control belt speed.

2) Description of the Related Art

Image forming apparatuses such as copying machines and printers capable of forming a full color image are increasing with the demands of the market. Such an image forming apparatus includes a so-called tandem type image forming apparatus. This type of image forming apparatus includes a plurality of photosensitive elements that are arranged in tandem, and a plurality of developing devices that develop toners of different colors corresponding to the photosensitive elements. In this image forming apparatus, toner images each having a single color are formed on the photosensitive elements, and the toner images of the single colors are sequentially transferred to a belt-shaped or a drum-shaped intermediate transfer element to form a full-color composite image.

The tandem type image forming apparatus may include a direct transfer system and an indirect transfer system. In the image forming apparatus with the direct transfer system as shown in FIG. 12, toner images formed on photosensitive elements 91Y, 91M, 91C, and 91K aligned in a row are sequentially transferred, by transfer devices 92, to a sheet of paper P (hereinafter, "sheet P") carried on a sheet conveying belt 93 that rotates in the direction of arrow A, and a full color image is formed on the sheet P. In the image forming apparatus with the indirect transfer system as shown in FIG. 13, toner images formed on the photosensitive elements 91Y, 91M, 91C, and 91K are sequentially transferred by superimposing, to an intermediate transfer belt 94 that rotates in the direction of arrow B. The toner images on the intermediate transfer belt 94 are collectively transferred to the sheet P, by a secondary transfer device 95. Note that a paper feed device 96 and a fixing device 97 are also shown in FIG. 12 and FIG. 13.

In the tandem type of image forming apparatus with the intermediate transfer belt as shown in FIG. 13, toner images of different colors formed on the photosensitive elements are superimposed on one another on the intermediate transfer belt to form a color image. Therefore, if positions on which the images are superimposed deviate from one another, color misalignment or a slight change in hue may occur in the color image. Thus, image quality degrades. Accordingly, the positional deviation (color misalignment) of the color toner images is a key problem.

Japanese Patent Application Laid Open No. H11-24507 (pages 3 to 4, FIG. 1) discloses a technology to correct unevenness in speed of a transfer belt in a color image forming apparatus using a conventional transfer belt.

In this technology, a color copying machine includes an intermediate transfer belt (or transfer belt) that is rotatably supported by five support rollers including one drive roller. Toner images of four colors of cyan, magenta, yellow, and black are sequentially transferred by superimposing to the circumferential surface of the intermediate transfer belt to form a full color image.

A scale with finely and accurately formed scale marks is provided on the internal surface of the intermediate transfer belt of the color copying machine. An optical detector (sensor) reads the scale to accurately detect the moving speed of the intermediate transfer belt. The moving speed detected is fed back by a feedback control system so that the intermediate transfer belt is made to move at an accurately controlled speed.

However, the scale may be worn out, damaged, or even dirty due to deposition of toner thereon, when the color copying machine is configured. Further, the scale with the scale marks formed along the belt is read by a sensor, the speed of the belt is detected based on information for the scale read, and the result of detection is fed back to controller so that the belt is made to move at an accurate speed. If the scale is worn out, damaged or dirty, the sensor may erroneously detect the scale mark(s) of the scale, thereby making it difficult to accurately control the belt speed.

SUMMARY OF THE INVENTION

It is an object of the present invention to solve at least the problems in the conventional technology.

A belt device according to an aspect of the present invention includes a scale that includes a plurality of scale marks formed thereon; a belt as an endless belt, with the scale formed along its whole circumference; a sensor that reads the scale to obtain scale information, wherein an actual belt speed of the belt, detected based on the scale information read, is used to correct a belt speed of the belt; a scale-mark degradation determining unit that determines whether the scale mark is degraded; and a belt drive controller that continuously provides control to correct the belt speed for a degraded portion of the belt, until the scale-mark degradation determining unit determines that there is no degradation.

An image forming apparatus according to another aspect of the present invention includes the above belt device; and a plurality of photosensitive elements that individually carry toner images of different colors, and that are made to rotate. The toner images of the different colors formed on the photosensitive element are sequentially transferred to the belt in a superimposed manner.

A belt speed control method according to still another aspect of the present invention is a method of performing belt speed control using a belt device. The method includes detecting an actual belt speed of a belt of the belt device, based on scale information read by a sensor; a first correcting including correcting a belt speed of the belt based on the actual belt speed detected; determining whether a scale mark on the belt is degraded; a second correcting including correcting the belt speed for a degraded portion of the belt to rotate the belt at a preset basic speed, if the degradation is determined; and continuing the second correcting until it is determined that there is no the degradation. The belt device includes a scale that includes a large number of scale marks formed thereon; the belt as an endless belt with the scale formed along its whole circumference; the sensor that reads the scale; and a scale-mark degradation determining unit that determines whether the scale mark is degraded.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1:
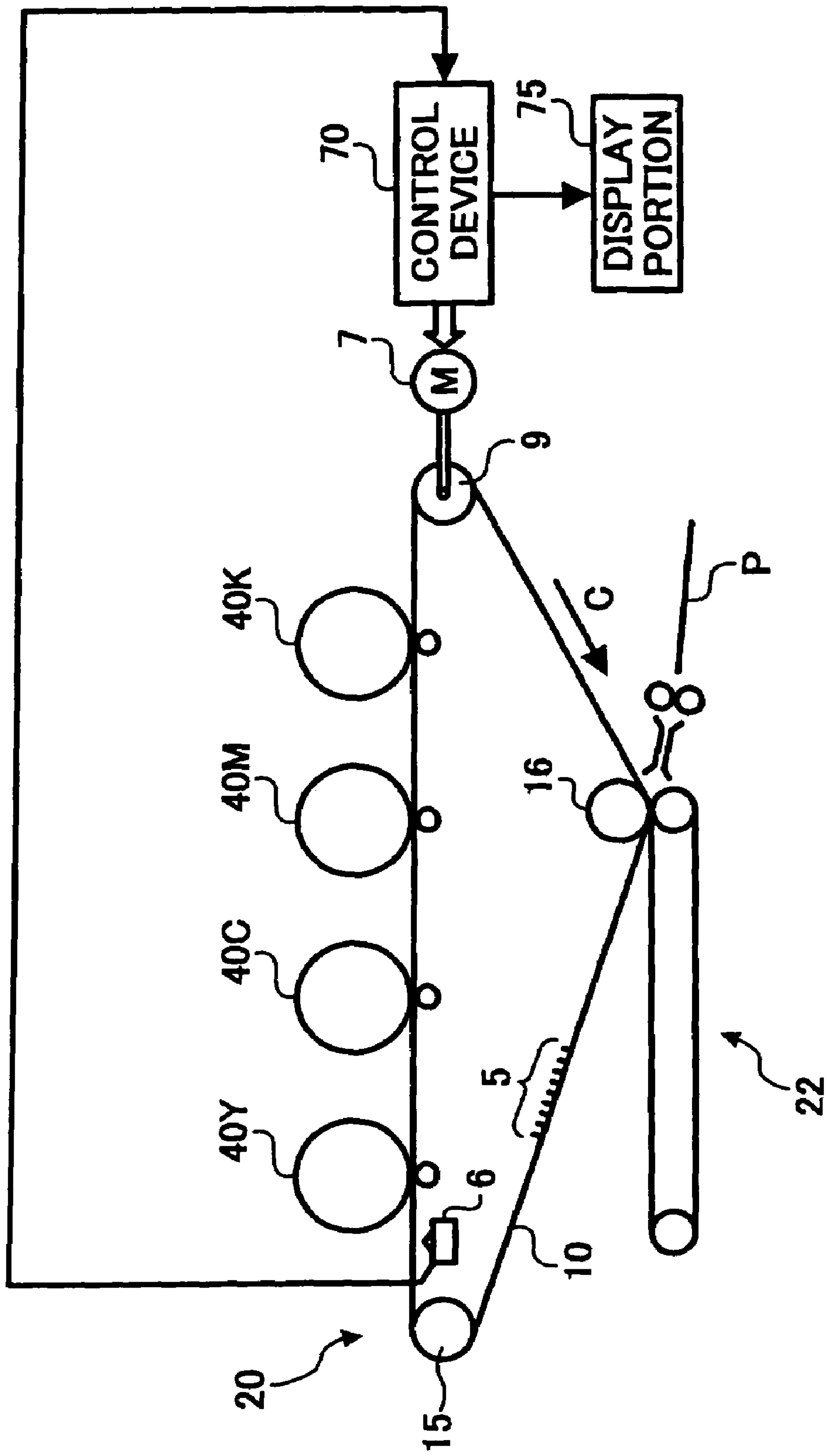
FIG. 1 illustrates a belt device with a belt-speed control system according to an embodiment of the present invention.
Figure 2:
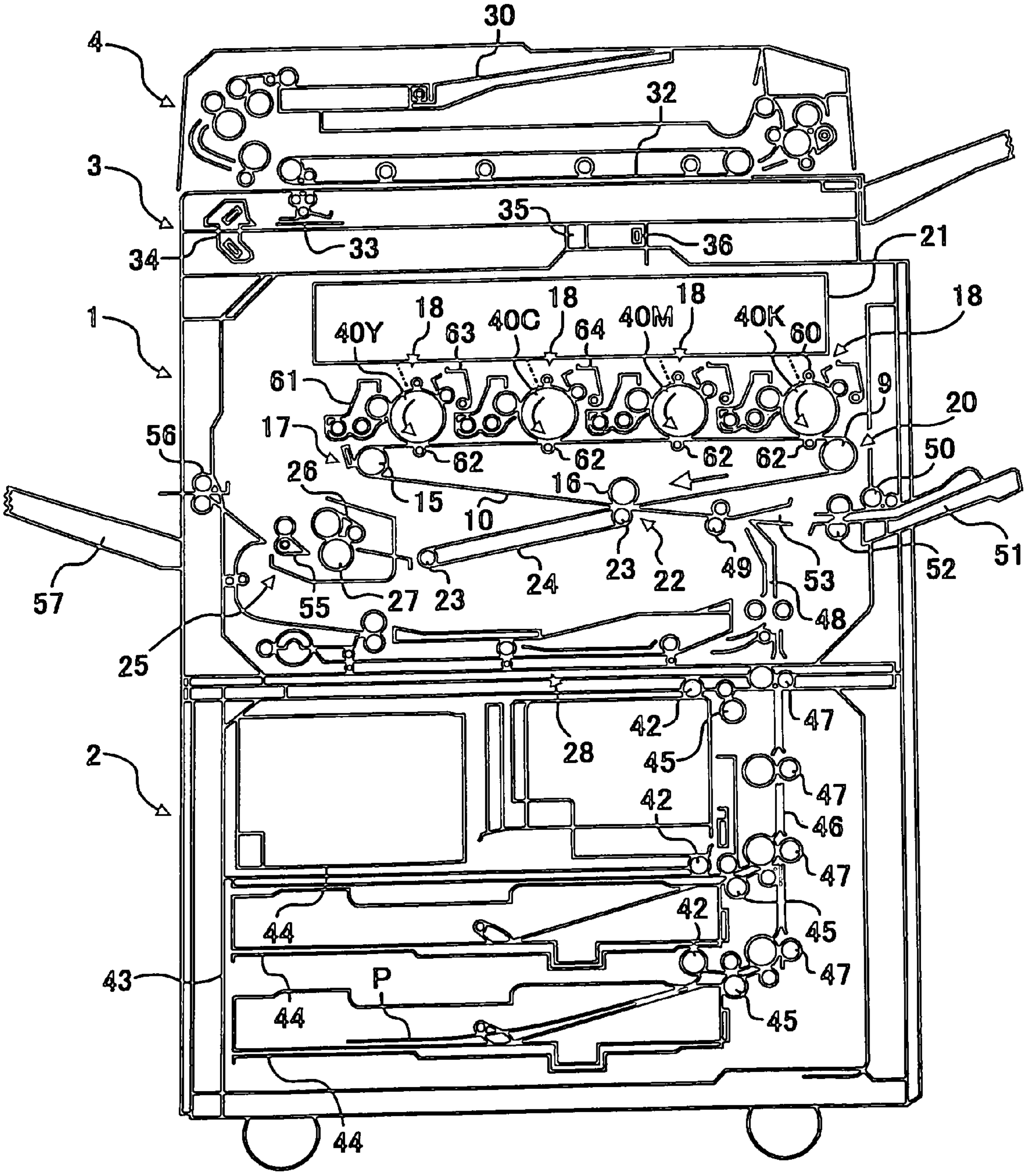
FIG. 2 illustrates an example of an entire color copying machine that is an image forming apparatus, including the belt device.
Figure 3:
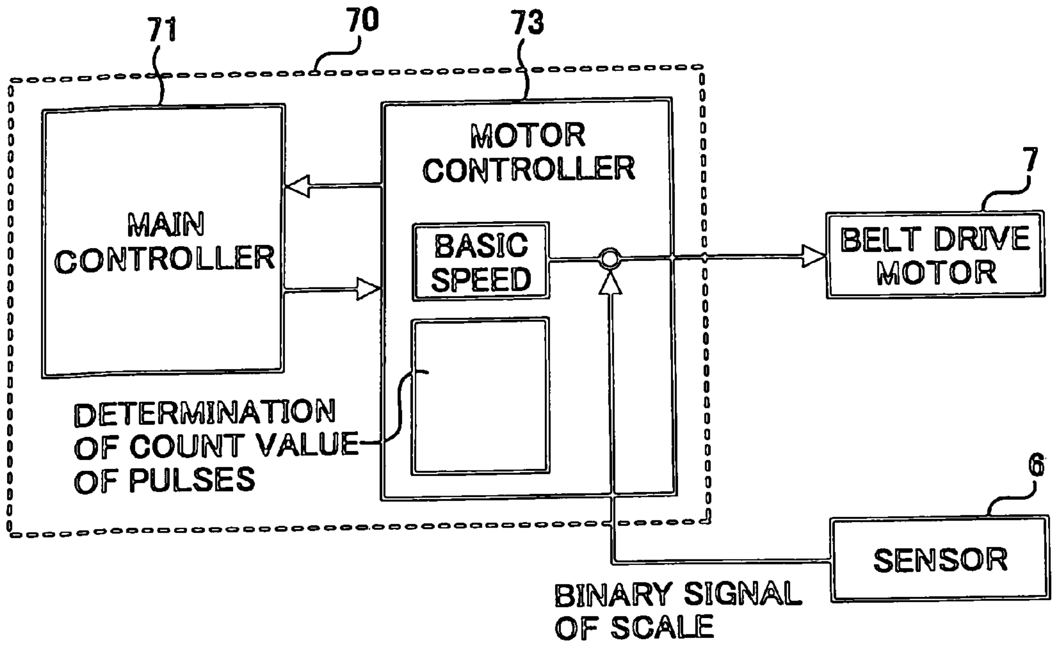
FIG. 3 is a block diagram of a belt-speed control system for an intermediate transfer belt of the color copying machine.

FIG. 1 illustrates a belt device with a belt-speed control system according to an embodiment of the present invention. FIG. 2 illustrates an example of an entire color copying machine that is an image forming apparatus, including the belt device. FIG. 3 is a block diagram of a belt-speed control system for an intermediate transfer belt of the color copying machine.

A belt device 20 according to this embodiment includes an intermediate transfer belt 10 that is an endless belt with a scale 5 formed along the whole circumference thereof, and that rotates in the direction of arrow C, the scale 5 having a plurality of scale marks formed thereon as shown in FIG. 1 (only few of the scale marks are shown in FIG. 1). The belt device 20 also includes a sensor 6 that reads the scale 5, and a control device 70 that detects an actual belt speed of the intermediate transfer belt 10 from information for the scale 5 read by the sensor 6, to correct a belt speed of the intermediate transfer belt 10 based on the actual belt speed detected.

The control device 70 includes a motor controller 73 (see FIG. 3) that functions as a scale-mark degradation determining unit. Based a signal from the sensor 6, the motor controller 73 determines how a slit portion 5*a* (see FIG. 4 and FIG. 5), which is a scale mark of the scale 5, is degraded. The motor controller 73 also functions as a belt drive controller that performs belt speed correction for a degraded portion (explained later) when determining the degradation, and continues the process until the determination of the degradation is stopped. The functions are explained in detail later.

As shown in FIG. 2, the belt device 20 is installed in the color copying machine that is the image forming apparatus, and serves as an intermediate transfer device.

The color copying machine is a tandem type electrophotographic device that uses the intermediate transfer belt 10, and a body 1 of the copying machine is placed on a paper feed table 2. A scanner 3 is mounted on the body 1, and an automatic document feeder (ADF) 4 is mounted on the scanner 3.

The belt device 20 having the intermediate transfer belt 10 is provided at a substantially central part of the body 1. A drive roller 9 and two secondary drive rollers 15 and 16 support the intermediate transfer belt 10 and move the intermediate transfer belt 10 in a clockwise direction (see FIG. 2). A cleaning device 17 is provided on the left side of the secondary drive roller 15, and removes toner remaining on the surface of the intermediate transfer belt 10 after an image is transferred.

Drum-shaped photosensitive elements 40Y, 40C, 40M, and 40K (hereinafter, "photosensitive drums 40Y, 40C, 40M, and 40K", or "photosensitive drums 40" unless otherwise specified) provided along the direction of the movement of the intermediate transfer belt 10, form four imaging units 18 of yellow, cyan, magenta, and black, respectively. The photosensitive drums 40 are provided above a linear part of the intermediate transfer belt 10 wound between the drive roller 9 and the secondary drive roller 15, and rotate in the counterclockwise direction. Images (toner images) formed on the photosensitive drums 40 are sequentially transferred directly by superimposing, to the intermediate transfer belt 10.

Provided around each of the photosensitive drums 40 are a charger 60, a developing device 61, a primary transfer device 62, a photosensitive-drum cleaning device 63, and a decharger 64, respectively. An exposing device 21 is provided above the photosensitive drums 40.

On the other hand, a secondary transfer device 22 is provided under the intermediate transfer belt 10. The secondary transfer device 22 transfers the images on the intermediate transfer belt 10 to a sheet P that is a recording material. The secondary transfer device 22 is realized by a secondary transfer belt 24 that is an endless belt wound between two rollers 23 and 23. The secondary transfer belt 24 is pushed against the secondary drive roller 16 through the intermediate transfer belt 10. The secondary transfer device 22 collectively transfers toner images on the intermediate transfer belt 10 to the sheet P fed into a space between the secondary transfer belt 24 and the intermediate transfer belt 10.

A fixing device 25 for fixing the toner image on the sheet P is provided on the downstream side of the secondary transfer device 22 in the direction of the sheet conveyance. A pushing roller 27 is pushed against a fixing belt 26 that is an endless belt in the fixing device 25.

The secondary transfer device 22 also serves a function of conveying the sheet with the image thereon, to the fixing device 25. The secondary transfer device 22 may use a transfer roller or a non-contact type charger.

A sheet reversing unit 28 is provided under the secondary transfer device 22. The sheet reversing unit 28 reverses the sheet to form images on both surfaces of the sheet.

For color copying, a document is placed on a document table 30 of the ADF 4. To place a document manually, the ADF 4 is opened, the document is placed on a contact glass 32 of the scanner 3, and the ADF 4 is closed to hold the document in place.

By pressing a start switch (not shown), the document placed on the ADF 4 is sent to the contact glass 32. If the document is manually placed on the contact glass 32, the scanner 3 is immediately driven, and a first running element 33 and a second running element 34 start running. Light is emitted from a light source disposed in the first running element 33 to the document. The light reflected from the surface of the document is directed toward the second running element 34, and is reflected by a mirror disposed in the second running element 34 to pass through an imaging lens 35. The light enters a reading sensor 36 where the contents of the document are read.

By pressing the start switch, the intermediate transfer belt 10 starts moving. At the same time, the photosensitive drums 40 start rotating to start formation of respective single color images of yellow, cyan, magenta, and black on the photosensitive drums 40. The color images on the photosensitive drums 40 are sequentially transferred by superimposing, to the intermediate transfer belt 10 that is moving in the clockwise direction, and a full-color composite image is formed.

Moreover, by pressing the start switch, a paper feed roller 42 in a selected paper feed stage of the paper feed table 2 is made to rotate, a sheet P is sent out from a paper feed cassette 44 selected from a paper bank 43, and the sheet P is separated by a separation roller 45 and is conveyed to a paper feed path 46.

The sheet P is conveyed by conveying rollers 47 to a, paper feed path 48 in the body 1 of the copying machine, and hits on registration rollers 49 to temporarily stop there.

If a sheet is manually fed, the sheet P placed on the manual feed tray 51 is sent in due to rotation of a paper feed roller 50. The sheet P is separated by a separation roller 52 and is conveyed to a manual feed path 53, and hits on the registration rollers 49 to temporarily stop there.

The registration rollers 49 start rotation at an accurate timing for synchronization with the composite color image on the intermediate transfer belt 10, and feeds the sheet P (being at rest temporarily) to a space between the intermediate transfer belt 10 and the secondary transfer device 22. The color image is transferred to the sheet P by the secondary transfer device 22.

The sheet P with the color image thereon is conveyed to the fixing device 25 by the secondary transfer device 22 that also functions as a conveying device. The color image on the sheet P is fixed by applying heat and pressure in the fixing device 25. The sheet P with the color image fixed thereon is guided to a discharge side by a switching claw 55, is discharged onto a paper discharge tray 57 by discharge rollers 56, and is stacked onto the paper discharge tray 57.

If a two-sided copy mode is selected, the sheet P with an image formed on one surface thereof is conveyed to the sheet reversing unit 28 by the switching claw 55, is reversed, and is guided again to the transfer position. Another image is formed on the rear surface of the sheet P at the transfer position, and the sheet P with the images on both surfaces is discharged onto the paper discharge tray 57 by the discharge rollers 56.

As shown in FIG. 1, the color copying machine includes the control device 70 that detects an actual belt speed of the intermediate transfer belt 10 from information for the scale 5 read by the sensor 6, and corrects a belt speed of the intermediate transfer belt 10 based on the actual belt speed detected.

The control device 70 includes a microcomputer that in turn includes a central processing unit (CPU) performing various determinations and processing, a read only memory (ROM) that stores process programs and fixed data, a random access memory (RAM) as data memory that stores processing data, and an input-output (I/O) circuit.

As shown in FIG. 3, the control device 70 further includes a main controller 71, and the motor controller 73 that functions as the scale-mark degradation determining unit. The motor controller 73 receives belt speed information for the intermediate transfer belt 10 obtained by detection of the scale 5 by the sensor 6, and controls the drive of a belt drive motor 7 that drives the intermediate transfer belt 10 based on the information (see FIG. 1 and FIG. 3).

The motor controller 73 outputs signals, for performing two belt speed corrections, to the belt drive motor 7. The two belt speed corrections include ordinary belt speed correction and belt speed correction for a degraded portion of the scale 5, (details are explained later). The motor controller 73 drives the belt drive motor 7 so that the intermediate transfer belt 10 is first made to rotate at a basic speed that is a preset base. Consequently, the intermediate transfer belt 10 starts rotating, and the scale 5 on the internal surface moves. The sensor 6 reads the scale 5 and feeds back a read result to the motor controller 73.

If the belt speed (actual speed) obtained from the feedback signal is equal to the basic speed, the motor controller 73 controls the drive of the belt drive motor 7 to maintain the basic speed as it is. However, if the belt speed is different and needs correction, the motor controller 73 controls the number of revolutions of the belt drive motor 7 depending on the difference, to thereby correct the belt speed. In other words, the motor controller 73 outputs the signal for performing ordinary belt speed correction to the belt drive motor 7 to control the belt drive motor 7. The belt speed correction is explained in detail later.

As explained above, the information for the scale 5 read by the sensor 6 is input to the motor controller 73, and is a binary pulse signal. The motor controller 73 compares a count value (frequency) of binary pulses counted within a preset specified time with a reference count value (frequency), and controls a feedback amount to be provided to the belt drive motor 7 based on a difference obtained by the comparison.

If the belt speed is constant and there is no scratch or toner deposition on any part of the slit portions 5*a* of the scale 5, an analog signal output from the sensor 6 when detecting the scale 5 on the intermediate transfer belt 10 becomes constant, and pulse signals obtained by binarizing the analog signal also become constant. The analog signal has an amplitude $f_1$ (explained later with reference to FIG. 5). Therefore, in this case, the belt speed correction based on the information on the scale 5 read by the sensor 6 does not cause any problem.

However, a scratch SC in the slit portion 5*a* of the scale 5 (see FIG. 7) or toner Tn deposited thereon (see FIG. 8) degrades the scale 5. In such cases, the number of binary pulse signals increases in the slit portion 5*a,* and therefore, the frequency is no longer the same as the specified frequency (count value of pulses). Therefore, the ordinary belt speed correction is performed using the information on the scale 5 read is inaccurate.

The motor controller 73 according to this embodiment, as shown in FIG. 3, stores a reference pulse for detecting degradation (hereinafter, "degradation-detecting reference pulse") in the RAM thereof, and outputs the degradation-detecting reference pulse from the RAM whenever necessary, and is used for controlling the belt speed (explained later with reference to FIG. 9). When the sensor 6 reads the scale 5, the sensor 6 outputs a binary pulse signal at a timing at which the degradation-detecting reference pulse reaches a preset number of reference pulses. The motor controller 73 determines whether the scale 5 is degraded by the scratch SC or the toner deposition on the slit portion 5*a* by determining whether the binary pulse signal (output signal) is not output by the sensor 6, or, whether an output signal, similar to the output signal that is output when the sensor 6 reads the scale 5, is output from the sensor 6 before the degradation-detecting reference pulse reaches the number of reference pulses.

When determining degradation of the scale 5, the motor controller 73 outputs a signal for performing seal correction (details are explained later) that is the belt speed correction for the degraded portion. Therefore, the control is performed so that the belt speed of the intermediate transfer belt 10 is not erroneous due to the scratch or toner deposition on the slit portion 5*a*.

The drive system of the intermediate transfer belt 10 and the belt speed detection system thereof are explained below with reference to FIG. 4 and FIG. 5.

As shown in FIG. 1, torque of the belt drive motor 7 is transmitted to the drive roller 9 that rotatably supports and drives the intermediate transfer belt 10.

The belt drive motor 7 rotates the drive roller 9 to allow the intermediate transfer belt 10 to rotate in the direction of arrow C. The torque during the operation may be transmitted directly to the drive roller 9, or may be transmitted thereto through a gear.

The intermediate transfer belt 10 is made of, for example, fluororesin, polycarbonate resin, and polyimide resin, and is an elastic belt obtained by forming the whole layer or a part of the intermediate transfer belt 10 with an elastic material.

Different single-color images (toner images) formed on the photosensitive drums 40Y, 40C, 40M, and 40K are sequentially transferred to the intermediate transfer belt 10 so as to be superimposed on one another.

Figure 4:
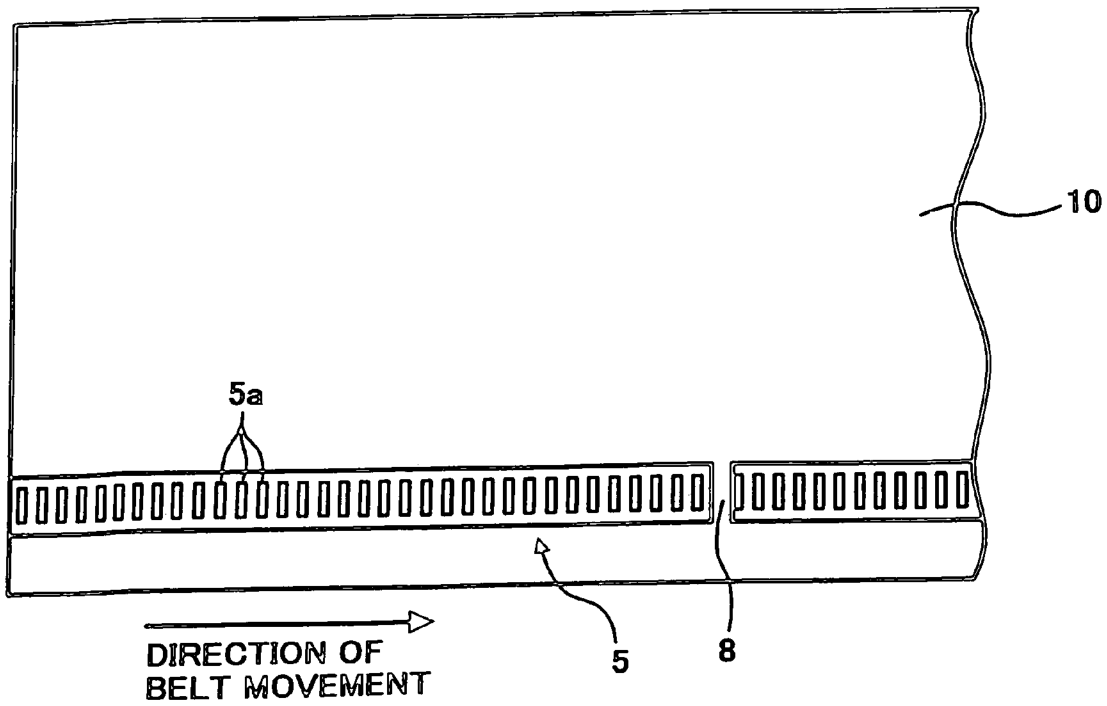
FIG. 4 is a partial plan view of the intermediate transfer belt along which a scale for detection of the belt speed is provided.

The scale 5 is formed along the internal surface or the external surface of the intermediate transfer belt 10, so that the scale marks are arranged at uniform intervals along the whole circumference thereof as shown in FIG. 4 (only a part of the scale marks is shown in FIG. 1). The scale 5 is positioned along an edge of the intermediate transfer belt 10 in the direction of the belt width, as shown in FIG. 4. The sensor 6 as shown in FIG. 1 may be disposed at any location, as long as the scale 5 on a linearly stretched portion of the intermediate transfer belt 10 can be detected.

Figure 5:
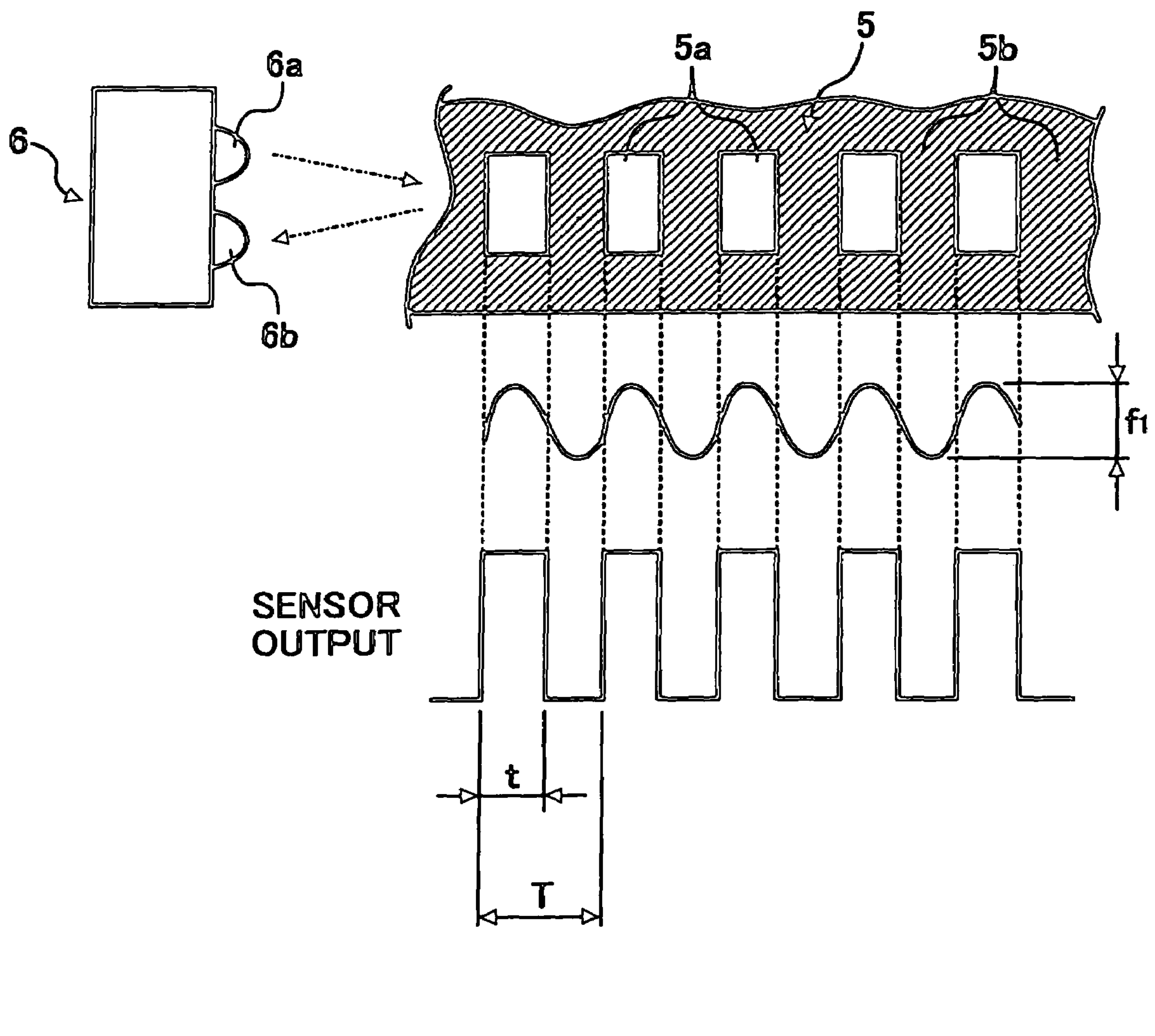
FIG. 5 illustrates a sensor that reads the scale on the intermediate transfer belt, and a sensor signal output by the sensor.

As shown in FIG. 5, the sensor 6 is a reflective type optical sensor including a light emitting element 6*a* and a light receiving element 6*b*. The light emitted from the light emitting element 6*a* toward the scale 5 is reflected, and is received by the light receiving element 6*b*. The amount of light reflected by the slit portions 5*a* that are the scale marks of the scale 5, and the amount of the light reflected by the rest part 5*b* of the scale 5 are detected differently.

In other words, the sensor 6 outputs two signals at high level (High) and low level (Low) based on a difference in reflectance between the slit portions 5*a* and the rest part 5*b*.

Assume that the sensor 6 is such that the light receiving element. 6*b* outputs a High signal in response to reception of the light, and that a reflectance of the slit portions 5*a* of the scale 5 is set higher than that of the rest part 5*b*. Then, during a time t, when the sensor 6 passes over the slit portion 5*a*, the sensor 6 outputs a High signal. Therefore, the sensor 6 repeatedly outputs High and Low, during rotation of the intermediate transfer belt 10, based on whether the slit portion 5*a* passes through a detection range of the sensor 6 as shown in FIG. 5.

Therefore, by obtaining a period (time) T from a time when the signal changes from Low to High until the next change from Low to High, a moving speed (belt speed) of the surface of the intermediate transfer belt 10 can be detected.

Note that this method is one of examples of detecting a belt speed of the intermediate transfer belt 10. Therefore, any sensor, any scale, and any method may be used if the belt speed can be detected by detecting a scale formed on the intermediate transfer belt 10.

Figure 6:
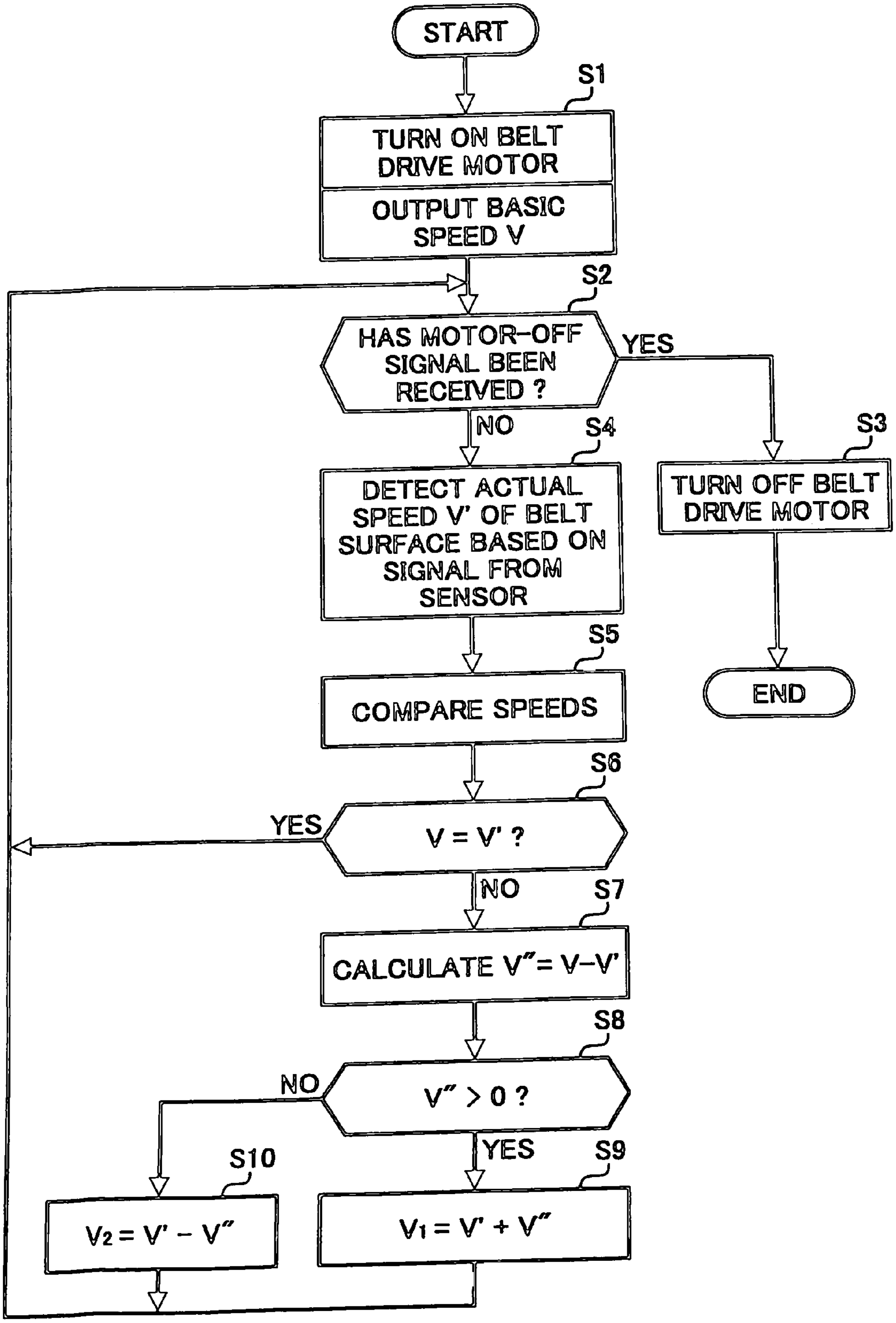
FIG. 6 is a flowchart of a process procedure of correcting a speed of the intermediate transfer belt.

The control of the belt speed of the intermediate transfer belt 10 is explained below with reference to FIG. 6.

The microcomputer of the control device 70 as shown in FIG. 1 starts the process of ordinary belt speed correction for the intermediate transfer belt 10 at a predetermined timing.

At step 1, the belt drive motor 7 is tuned on to rotate the belt drive motor 7 at a basic speed that is a target speed (which is controlled by the motor controller 73 as shown in FIG. 3), and the process proceeds to step 2. At step 2, it is determined whether an OFF signal for turning off the belt drive motor 7 has been received. If it is determined that the OFF signal has been received (Yes at step 2), the process proceeds to step 3 where the belt drive motor 7 is turned off, and the process ends.

If the OFF signal has not been received at step 2 and the process proceeds to step 4, a feedback signal is received from the sensor 6, and an actual speed V' of the surface of the intermediate transfer belt 10 is detected from the information. At step 5, the basic speed V and the actual speed V' are compared with each other.

At step 6, it is determined whether the basic speed V is equal to the actual speed V' (V=V'). If the basic speed V is equal to the actual speed V' and if there is no speed difference (but there may be an allowable speed difference) (Yes at step 6), it is determined that the surface of the intermediate transfer belt 10 rotates at the same speed as the basic speed V. Therefore, the process returns to step 2 where the determinations and processes at step 2 and thereafter are repeated.

At step 6, if the basic speed V is not equal to the actual speed V' (No at step 6), the process proceeds to step 7 where a speed difference V" between the basic speed V and the actual speed V' of the intermediate transfer belt 10 is calculated (V"=V−V').

At step 8, it is determined whether the speed difference V" is greater than zero (V">0). If V">0 (Yes at step 8), it is determined that the actual speed V' is slower than the basic speed V. Therefore, the process proceeds to step 9 where the number of revolutions of the belt drive motor 7 is controlled so that the actual speed V' is brought to a speed $V_1$ by adding the speed difference V" to the actual speed V' ($V_1$=V'+V"), and then the process returns to step 2.

At step 8, if it is determined that the speed difference V" is not greater than zero (V"<0) (No at step 8), it is determined that the actual speed V' of the intermediate transfer belt 10 is more than the basic speed V. Therefore, the process proceeds to step 10 where the number of revolutions of the belt drive motor 7 is controlled so that the actual speed V' is brought to a speed $V_2$ by subtracting the speed difference V" from the actual speed V' ($V_2$=V'−V"), and then the process returns to step 2.

The determinations and processes at step 2 and thereafter are repeated, and correction is performed so that the actual speed V' is brought to the basic speed V. If it is determined at step 2 that the OFF signal that turns off the belt drive motor 7 has been received, the process proceeds to step 3 where the belt drive motor 7 is turned off, and the process ends.

The scale 5 on the intermediate transfer belt 10 may be provided on the internal side of the belt or may be provided on the external side thereof. As explained in the embodiment of the present invention, there are some advantages in the case where the scale 5 is provided on the internal side of the belt. That is, soiling of the scale 5 or deposition of foreign matter on the scale 5 is difficult. Furthermore, scratching of the scale 5 is difficult, and because the sensor 6 that reads the scale 5 is also provided on the internal side of the belt, the sensor 6 also is not soiled.

On the other hand, there are some disadvantages when the scale 5 is provided on the internal side of the belt. That is, the sensor 6 of a large size cannot be used, a direction in which the sensor is provided is restricted, and a distance between the sensor and the belt is restricted.

Conversely, there are some advantages in the case where the scale 5 is provided on the external side of the belt. That is, the sensor 6 that reads the scale 5 is less restricted to its arrangement. However, there are some disadvantages such that the scale 5 may be soiled easily, foreign matter may be deposited on the scale 5 easily, and the scale 5 is easier to be scratched.

In the belt device 20 according to the embodiment of the present invention, the scale 5 is provided on the internal side of the intermediate transfer belt 10 as shown in FIG. 1. However, the slit portion **5*a* (see FIG. 5) may be finely scratched or may be deposited with foreign matter such as toner as time passes, which causes the reflectance of the reflective surface to degrade. If the reflectance is degraded, a pulse frequency output by the sensor 6 when detecting the slit portion 5*a*** becomes abnormal.

If the belt speed of the intermediate transfer belt 10 is controlled to be constant, then the frequency of pulse signals output from the sensor 6 when reading the scale 5 becomes constant. In other words, the count value of the pulse signals that are counted within the preset specified time becomes constant.

Figure 7:
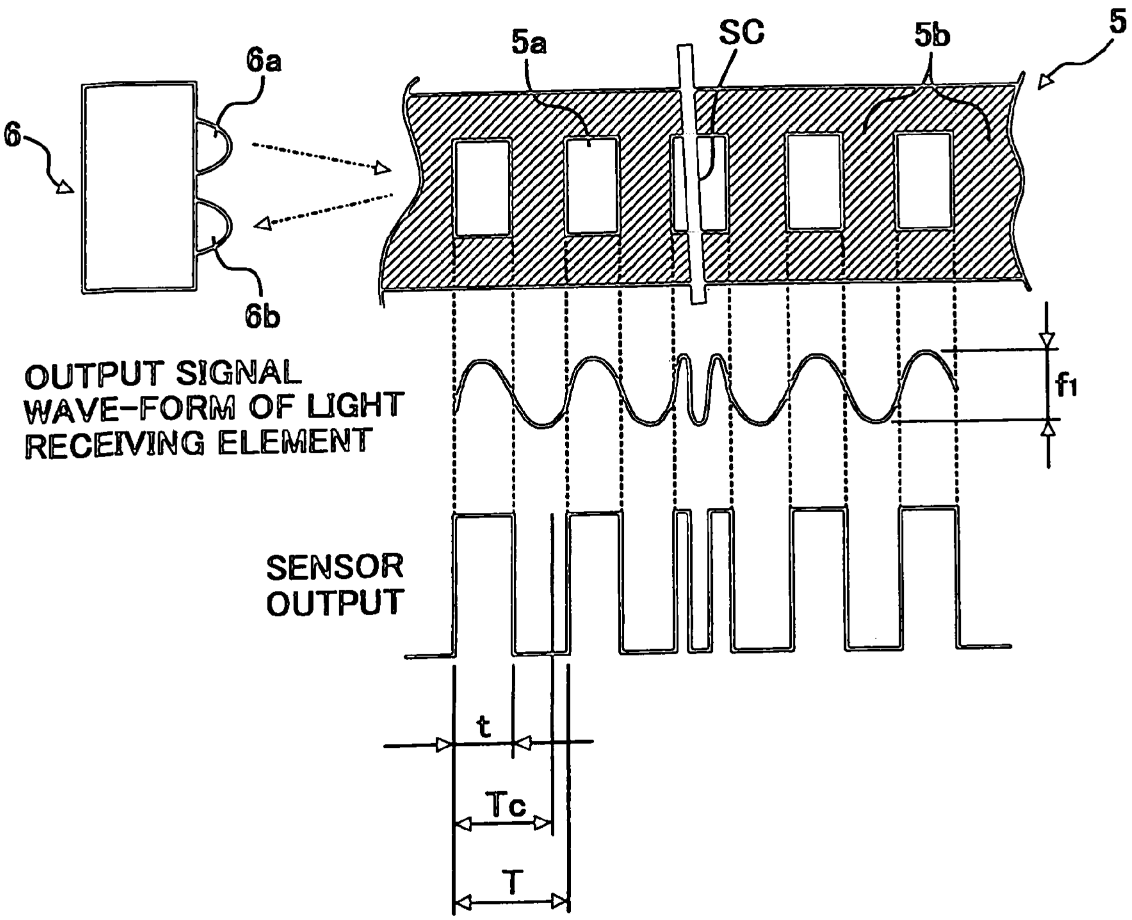
FIG. 7 illustrates a sensor output when one of the scale marks is damaged.
Figure 8:
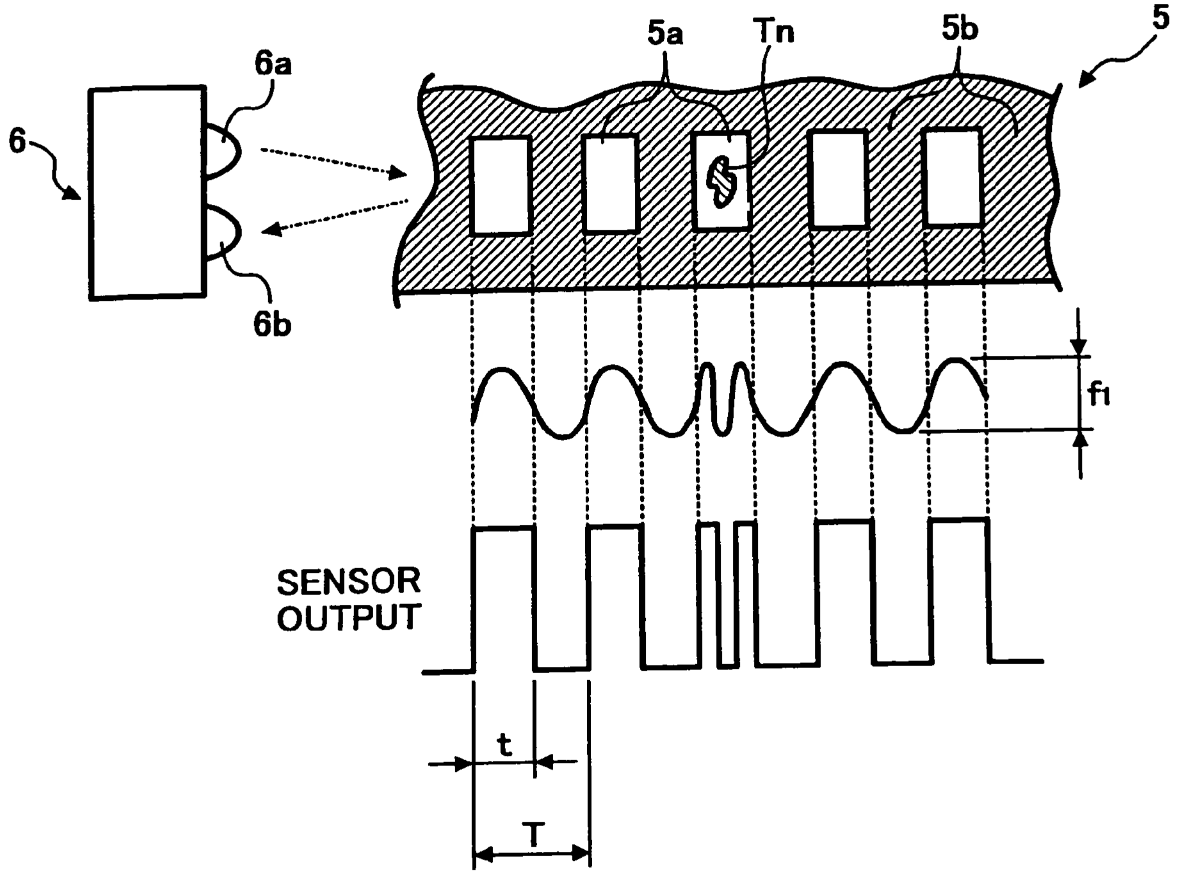
FIG. 8 illustrates a sensor output when one of the scale marks is soiled with toner.

However, there is a case where the scale 5 is degraded by the scratch SC on a part of the slit portions **5*a* as shown in FIG. 7 or by foreign matter such as a lump of the toner Tn deposited on a part of the slit portions 5*a* as shown in FIG. 8. In this case, an analog output signal, that is supposed to be output with an amplitude f1 from the sensor 6, is output as several pulses. Thus, a part of waveform of the analog output signal is improper, or there may be a two-pulse output in place of the original one-pulse output. Under these situations, an output frequency of binary digital signals (pulses) also changes, which causes an abnormal state, different from a reference frequency when there is neither a scratch nor dirt on the slit portion 5*a***.

If such abnormality occurs in the frequency, the motor controller 73 of the control device 70 as shown in FIG. 3 cannot drive the belt drive motor 7 at a constant speed because the motor controller 73 controls the belt drive motor 7 based on the binary pulse signals. As a result, the intermediate transfer belt 10 cannot be corrected to an accurate belt speed, thereby causing color misalignment or the like to occur when a color image is formed.

However, as explained above, the belt device 20 and the color copying machine with the same include the motor controller 73 that functions as the scale-mark degradation determining unit, which determines how the slit portion **5*a* (see FIG. 4 and FIG. 5) is degraded. If the scale-mark degradation determining unit determines the degradation, the control device 70, which functions as the belt drive controller, continues the belt speed correction for the degraded portion such that the belt speed is controlled to the preset basic speed until the scale-mark degradation determining unit determines that there is no degradation of the slit portion 5*a***.

The belt speed correction for the degraded portion is the same as the seal correction that is performed on a seal 8 (FIG. 4) of the scale 5.

As explained above, the belt device 20 and the color copying machine including the same perform the belt speed correction for the degraded portion. Therefore, even if the scale 5 is degraded by a scratch on a part of the scale 5 or by deposition of foreign matter such as a lump of toner thereon, the belt device 20 and the color copying machine can drive the belt drive motor 7 at the constant speed to accurately correct the belt speed of the intermediate transfer belt 10 so that color misalignment does not occur in the color image.

How to determine whether the slit portion **5*a* is degraded and how to perform the belt speed correction for the degraded portion (seal correction) are explained below with reference to FIG. 9**.

The RAM of the motor controller 73 as shown in FIG. 3 stores the degradation-detecting reference pulse for the scale 5 as factory default setting. Therefore, the degradation-detecting reference pulse is output at any time when the belt device is driven. As shown in FIG. 9, the degradation-detecting reference pulse is set so that a number of reference pulses are output within one pulse of a sensor output signal that is output when the sensor 6 detects the slit portion **5*a***.

Figure 9:
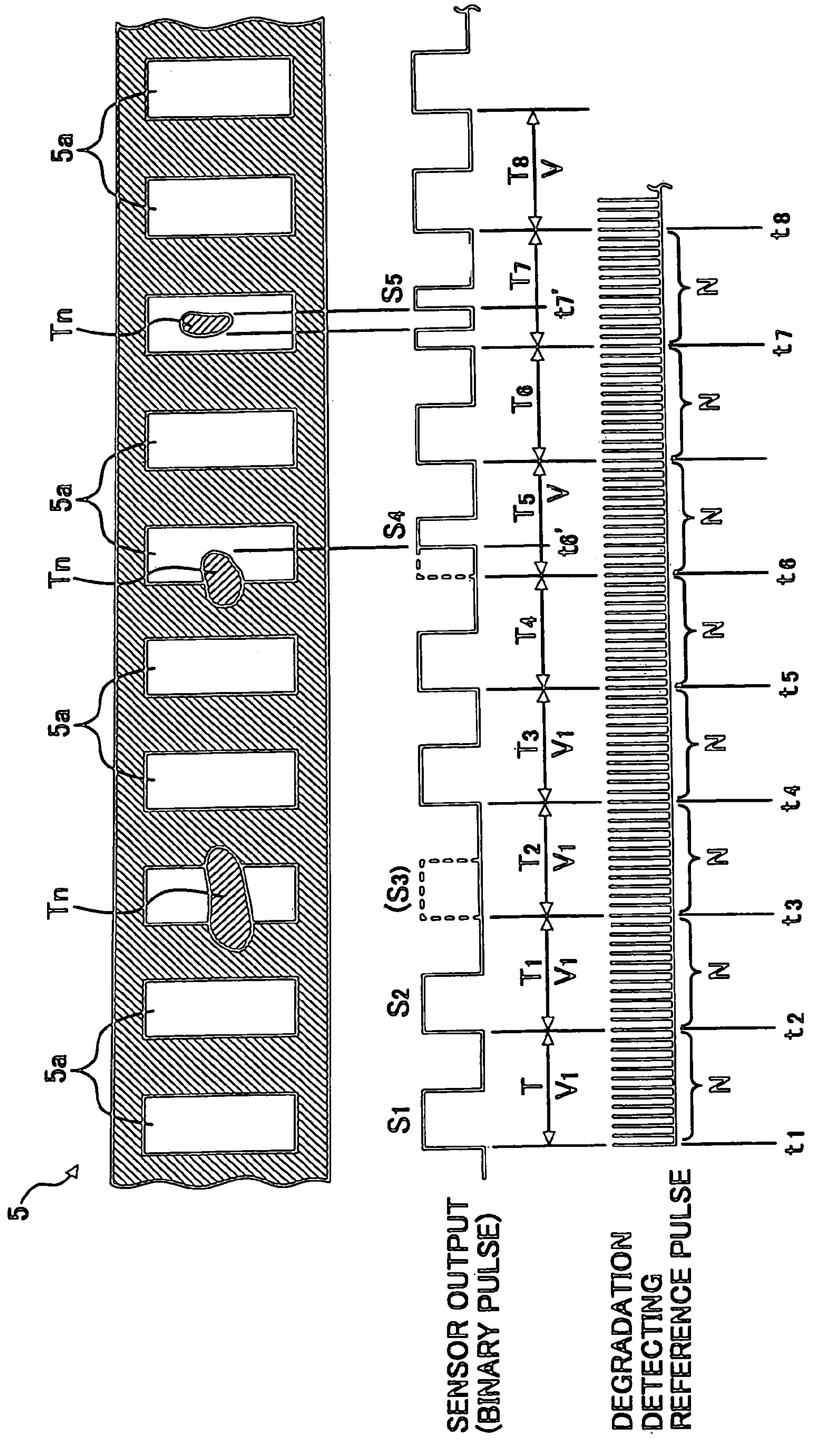
FIG. 9 illustrates how to determine degradation of a slit portion of the scale, and a process of belt speed correction for a degraded portion.

The number of degradation-detecting reference pulses that is output during one period T of the sensor output as shown in FIG. 9 is drawn strictly as an image, and therefore, the number can be changed if necessary.

When the intermediate transfer belt 10 is made to rotate, the motor controller 73 repeatedly counts the degradation-detecting reference pulse up to the number N of reference pulses during a time corresponding to each period T (Tn). In other words, the motor controller 73 starts counting the degradation-detecting reference pulses at a time $t_1$ as shown in FIG. 9, and receives a High sensor output signal $S_2$ on its rising edge at a timing of time $t_2$. The time $t_2$ indicates a time at which the number of degradation-detecting reference pulses counted reaches the number N of reference pulses if there is neither a scratch nor a lump of toner on the slit portions **5*a* through rotation of the intermediate transfer belt 10 at a normal belt speed. Therefore, in this case, the belt device 20 determines that the slit portion 5*a*** is not degraded, i.e., is in a normal state, and controls the speed to the ordinary belt speed $V_1$ without performance of the seal correction that is the belt speed correction for a degraded portion during the next period $T_1$.

However, like an example in a period $T_2$ from a time $t_3$ to a time $t_4$ as shown in FIG. 9, if a large lump of toner Tn is present on the slit portion **5*a* (the same goes for a scratch), the motor controller 73 cannot detect the rising edge of a sensor signal $S_3$ at a timing of the time $t_3$. Therefore, in this case, the belt device 20 determines that the slit portion 5***a* is degraded, and performs the belt speed correction (seal correction) for the degraded portion during the next period $T_3$ to control the belt speed to the basic speed V.

Like an example in a period $T_4$ from a time $t_5$ to a time $t_6$ as shown in FIG. 9, if a lump of toner Tn is present on a part of the slit portion 5*a*, the motor controller 73 detects the rising edge of a sensor signal $S_4$ at a delayed timing of a time $t_6$', instead of at a timing of the time $t_6$. The time $t_6$ indicates a time at which the number of degradation-detecting reference pulses, the counting of which started at the time $t_5$, reaches the number N of reference pulses. Therefore, the belt device 20 determines that the slit portion 5*a* is degraded, and performs the belt speed correction for the degraded portion during the next period $T_5$ to control the belt speed to the basic speed V.

Furthermore, like an example in a period $T_7$ from a time $t_7$ to a time $t_8$ as shown in FIG. 9, if a lump of toner Tn or a scratch is present inside the slit portion 5*a*, the motor controller 73 detects the rising edge of a sensor signal $S_5$ at a time $t_7$'. The time $t_7$' indicates a time before the number of degradation-detecting reference pulses, the counting of which started at the time $t_7$, reaches the number N of the reference pulses. Therefore, in this case also, the belt device 20 determines that the slit portion 5*a* has a small degraded portion, and performs the belt speed correction for the degraded portion during the next period $T_8$ to control the belt speed to the basic speed V.

The belt speed control method in the belt device 20 includes steps explained below. That is, the method includes performing the ordinary belt speed correction in which an actual belt speed of the intermediate transfer belt 10 is detected from information for the scale 5 read by the sensor 6 to correct the belt speed based on the actual belt speed detected. Further, when the scale-mark degradation determining unit determines the degradation of the slit portion 5*a*, the belt speed correction for a degraded portion is performed such that the intermediate transfer belt 10 is made to rotate at the preset basic speed and the process of correction is continued until the scale-mark degradation determining unit determines that there is no degradation. Therefore, even if the slit portion 5*a* is degraded, the belt speed of the intermediate transfer belt 10 can be accurately controlled.

Figure 10:
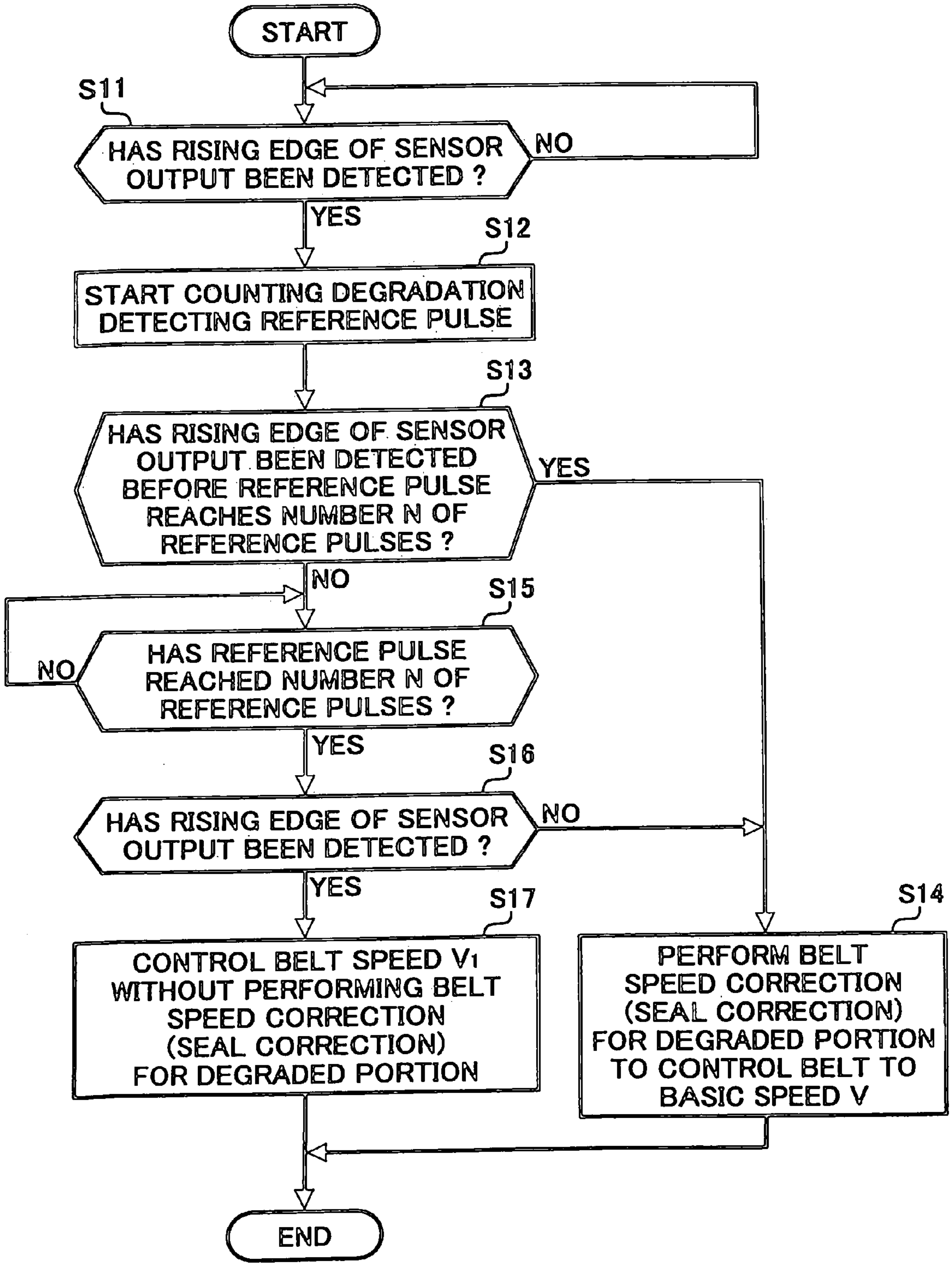
FIG. 10 is a flowchart of a process procedure of belt speed correction for the degraded portion.

FIG. 10 is a flowchart of the process procedure of belt speed correction for the degraded portion.

When the process is started, at step 11, it is determined whether the rising edge of a binary sensor output of the sensor 6 has been detected. If the rising edge has been detected (Yes at step 11), then at step 12, counting of the degradation-detecting reference pulse starts. If the rising edge has not been detected (No at step 11), the process returns to "start". At step 13, it is determined whether the rising edge of the sensor output has been detected before the number of the degradation-detecting reference pulses reaches the number N of reference pulses.

If the rising edge has been detected (Yes at step 13), the process proceeds to step 14 where the belt speed correction for a degraded portion is performed to control the belt speed of the intermediate transfer belt 10 to the basic speed V.

If the rising edge of the sensor output has not been detected before the number of degradation-detecting reference pulses reaches the number N of reference pulses (No at step 13), at step 15, it is determined whether the number of degradation-detecting reference pulses has reached the number N of reference pulses. At step 15, if the count has not reached the number N of reference pulses (No at step 15), the step 15 is repeated.

If the count has reached the number N of reference pulses (Yes at step 15), at step 16, it is determined whether has been detected. If the rising edge of the sensor output has not been detected (No at step 16), the process proceeds to step 14 where the belt speed correction for the degraded portion is performed to control the belt speed of the intermediate transfer belt 10 to the basic speed V. If the rising edge of the sensor output has been detected (Yes at step 16), the process proceeds to step 17 where the belt speed is controlled to the belt speed $V_1$ without performing the belt speed correction for the degraded portion, and the process ends.

These steps are repeated in each period T. During the process in the second period and thereafter, the rising edge of the sensor output is detected at the initial step 11, and then a counter is reset once before the counting of degradation-detecting reference pulse starts.

The number N of reference pulses as shown in FIG. 9 needs to be set to a value having an allowance like N−δ to N+δ, where δ is a value determined by considering fluctuations or the like. If the allowance is not provided, the detection of the rising edge of the output of the sensor 6 may fail due to fluctuations in the slit portions 5*a*, even if there is neither a scratch nor a lump of toner on the slit portion 5*a*, and the rising edge may be detected before the degradation-detecting reference pulse reaches the number N of reference pulses, which results in erroneous detection.

As explained above, by providing the allowance to the number N of reference pulses, even if the belt speed changes slightly within the allowance, due to fluctuations in load applied to the belt, the change may not be detected. The amount of the change in the belt speed accumulates more and more in each period, which leads to the increased change.

However, the belt device detects the actual belt speed V' of the intermediate transfer belt 10 from the count of pulses output from the sensor 6, the pulses being counted within the preset specified time including an allowance wider than the time during which the degradation of the scale 5 is detected. The actual belt speed V' detected is compared with the basic speed as explained with reference to FIG. 6 to correct the belt speed, which allows the intermediate transfer belt 10 to be controlled to an accurate belt speed.

In the embodiment, how the slit portion 5*a* of the scale 5 is degraded is determined using the degradation-detecting reference pulses. However, how the slit portion 5*a* is degraded may be determined by comparing the frequency of a value output from the sensor 6 when reading the scale 5, with the preset reference frequency.

The seal correction that is the belt speed correction for a degraded portion is also performed when the seal 8 as shown in FIG. 4 is detected.

In other words, when the sensor 6 detects the seal 8 of the scale 5, the slit portion 5*a* as shown in FIG. 4 is not present in the seal 8. Therefore, a pulse signal is not output from the sensor 6 at this seal portion, and the belt speed control based on the information for the scale 5 cannot be performed. Therefore, in order to keep the belt speed in a normal state even at the seal 8, the seal correction is performed when the sensor 6 detects the seal 8, to control the belt speed of the intermediate transfer belt 10 to the basic speed V.

In order to control the belt speed to the basic speed V, a current passing through the belt drive motor 7 is made equal to a current at which the belt speed becomes the basic speed V. Alternatively, a voltage to be applied to the belt drive motor 7 may be controlled, or a frequency may be controlled.

Occurrence of unevenness in speed of the intermediate transfer belt 10 due to a scratch or dirt on the slit portion 5*a* of the scale 5 is explained in detail below.

As shown in FIG. 7, if one of the slit portions 5*a* that serves as a reflective portion of the scale 5 has a scratch SC (the same goes for deposition of foreign matter) in a direction substantially perpendicular to the direction of movement of the belt, the analog signal waveform output from the light receiving element 6*b* of the sensor 6 changes as shown in the figure, which leads to an increase in its frequency. Consequently, a pulse of the binary signal increases to two pulses within one period of one slit portion 5*a*.

If such a case occurs, the control device 70 (FIG. 1) receives the pulses of the binary signal to correct the belt speed, determines that the belt speed is faster from an increase in the pulses in the portion containing the scratch SC, and controls the belt drive motor 7 to reduce the belt speed.

Note that this only indicates that the frequency has increased due to degradation of the scale 5 due to the scratch SC, and does not indicate that the actual belt speed has partially increased. However, the control is performed to reduce the belt speed, which causes unevenness in speed to occur.

For example, as shown in the period $T_2$ of FIG. 9, if the large lump of toner Tn or the large scratch that covers the entire slit portion 5*a* of the scale 5, the analog signal waveform output from the light receiving element 6*b* has a low frequency because the pulse of the binary signal corresponding to the lump of toner Tn or the scratch is not output.

If such a case occurs, the control device 70 determines that the belt speed is slower from a decrease in the pulse, contrary to the case of the small lump of toner or the small scratch, and controls the belt drive motor 7 so as to increase the belt speed, which results in unevenness in speed.

As explained above, the scratch or the like may be a small one present in one slit portion 5*a,* or may be a wide one that covers several slit portions 5*a.*

As explained with reference to FIG. 4, the scale 5 formed along the intermediate transfer belt 10 has the seal 8. The space formed in this seal 8 is generally about 3 millimeters (mm) at maximum. Therefore, assuming that the belt speed (linear velocity) of the intermediate transfer belt 10 is 250 mm/s, the sensor 6 does not output a pulse signal at an interval of 12 milliseconds (ms) to detect the 3 mm-wide seal 8, when the intermediate transfer belt 10 is rotating.

Assume that the specified number of pulses (reference frequency) in the image forming apparatus is 416 pulses. The specified number of pulses is output when the sensor 6 detects a normal scale 5 without degradation within a preset specified time (e.g., 1 ms) upon rotation of the intermediate transfer belt 10. For example, if the scale 5 has a scratch that spreads over 10 slit portions 5*a,* the pulse signals corresponding to the portion are not output, and therefore, the number of pulses within the specified time is 406 (416−10) that is less than 415. Therefore, the control device 70 performs seal correction for the portion with less number of pulses, i.e., degraded portion.

If the time for executing the seal correction exceeds 12 ms, the control device 70 determines that a large scratch or foreign matter having a length exceeding the space of the seal 8 is deposited on the scale 5, and stops the belt drive motor 7. This reduces a risk of an abnormal image output (e.g., color misalignment). The control device 70 causes a display portion 75 (FIG. 1) that is visible on the outside of the device, to display a prompt indicating that the belt has stopped.

In other words, the control device 70 also functions as a belt-drive stop controller that stops the rotation of the intermediate transfer belt 10 when it is determined that the scale 5 is degraded by a predetermined value or more, if the time for execution of the seal correction exceeds 12 ms. Furthermore, the control device 70 also functions as a display unit that causes the display portion 75 to display a message when the belt-drive stop controller stops the rotation of the intermediate transfer belt 10.

The timing at which the rotation of the intermediate transfer belt 10 is made to stop is preferably set to a time after the process of image formation in process, is complete. Alternatively, the stopping may be performed after formation of all images requested is complete.

The display portion 75 also includes a display for informing belt replacement and a display for informing that the belt is soiled.

As shown in FIG. 7, if only one of the slit portions 5*a* of the scale 5 has a fine scratch SC, the number of pulses within the specified time increases by one pulse with respect to the specified number of pulses to result in 417 pulses.

In this cases also, the control device 70 performs the seal correction (belt speed correction for the degraded portion).

The color copying machine according to the embodiment stores the number of times of performing the seal correction (the number of times of detecting degraded portions each having 417 pulses or more) to cause the display portion 75 to display an alarm when the number of times reaches the specified number or more. This control is also performed by the control device 70. The specified number of times is the number to be preset, and is determined through experiments.

Figure 11:
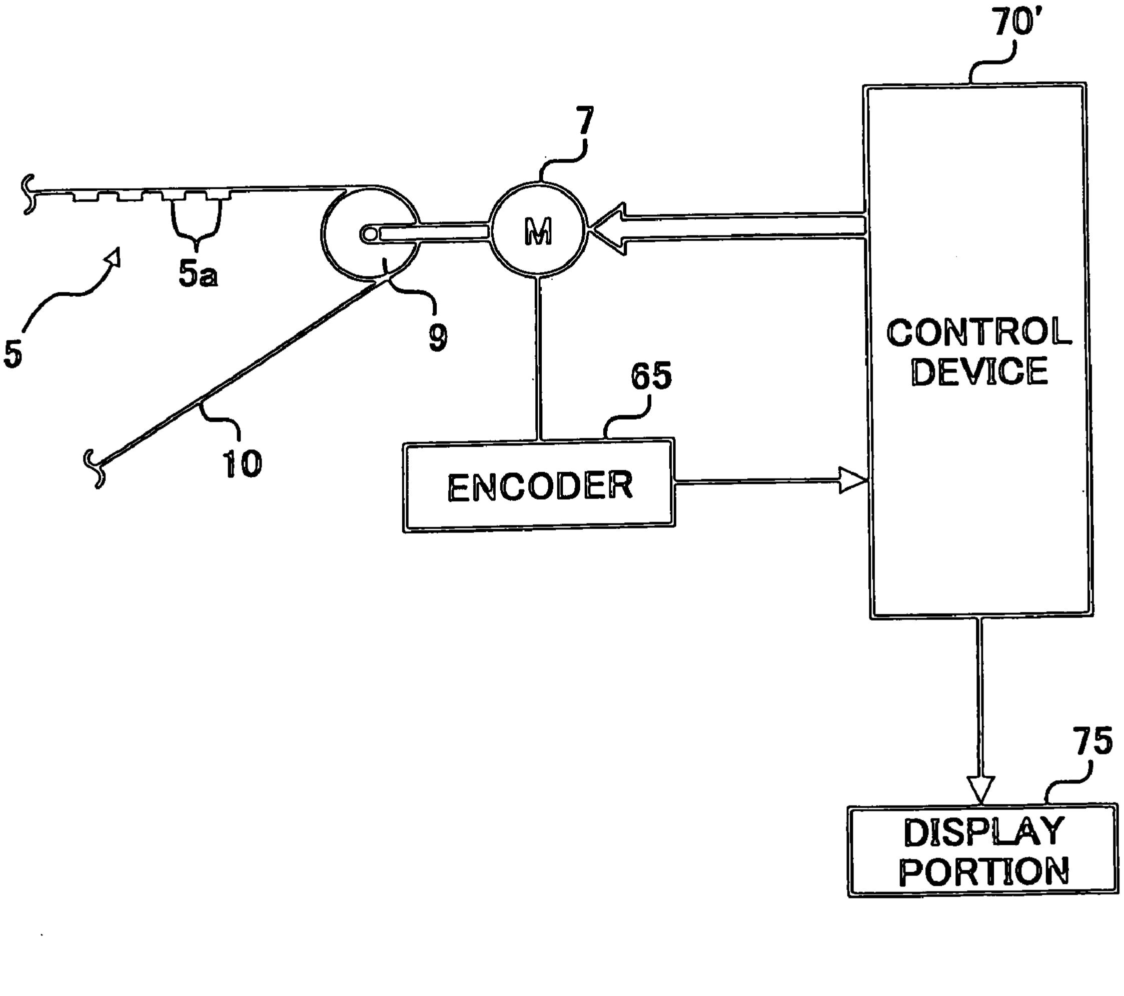
FIG. 11 illustrates another belt-speed control system that uses an encoder.
Figure 12:
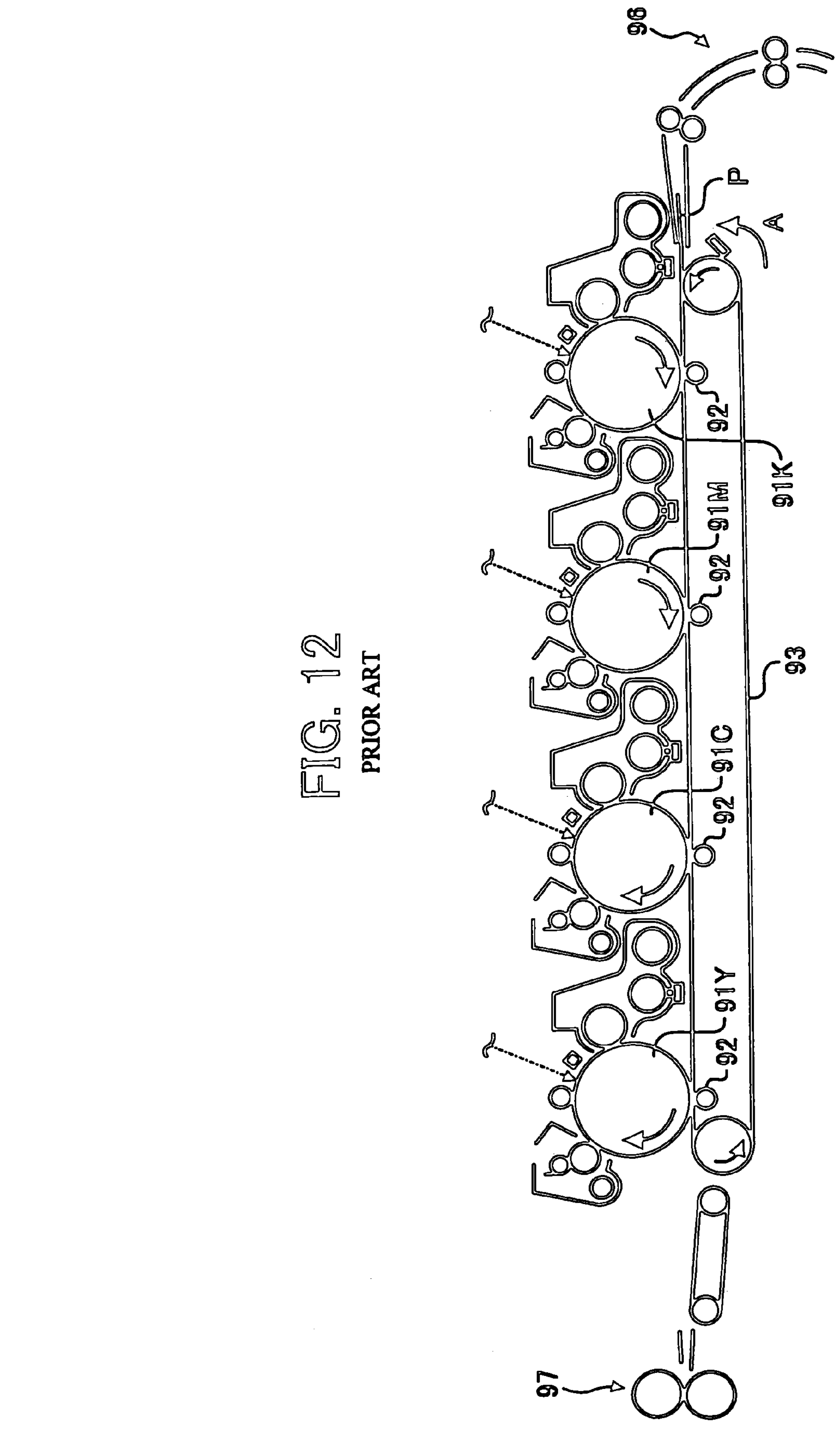
FIG. 12 PRIOR ART
FIG. 12 illustrates an imaging unit in a conventional image forming apparatus that includes a direct transfer system.
Figure 13:
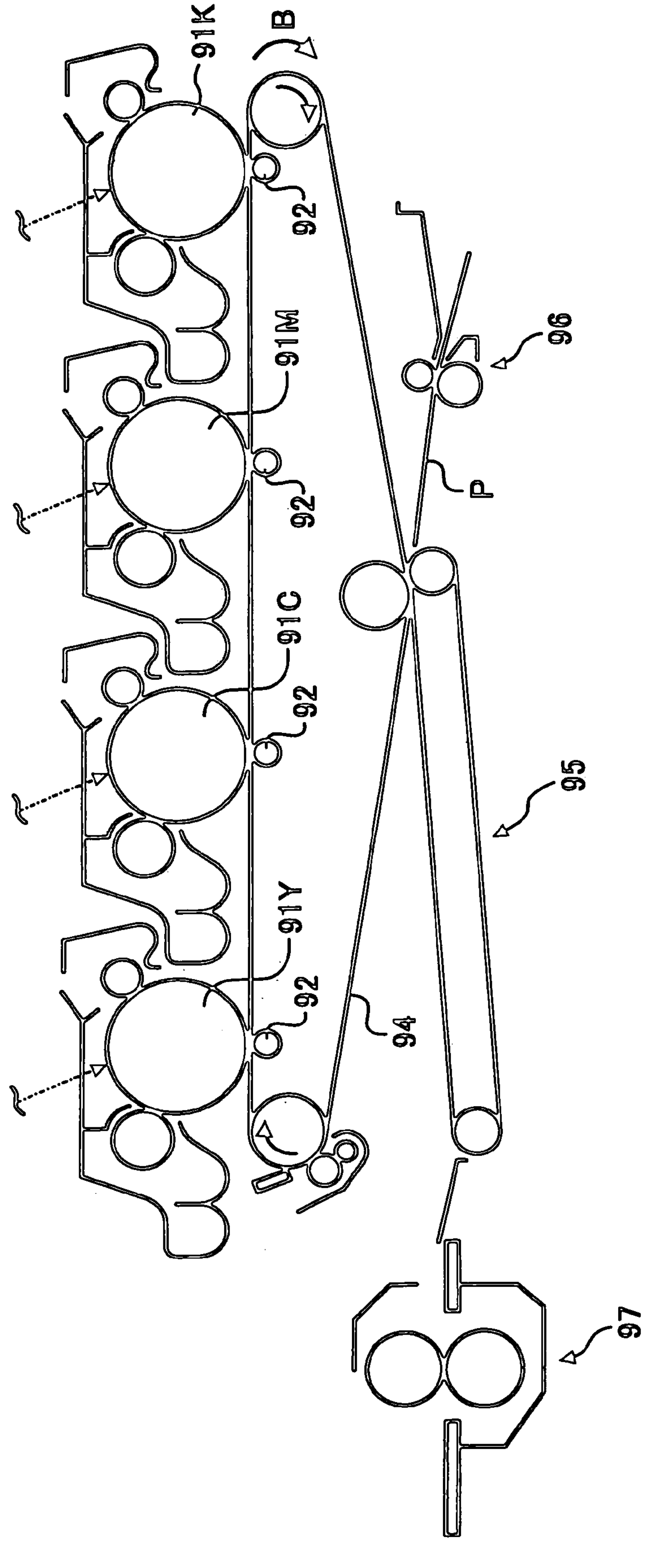
FIG. 13 PRIOR ART
FIG. 13 illustrates an imaging unit in a conventional image forming apparatus that includes an indirect transfer system.

As shown in FIG. 11, another belt-speed control system without using the information for the scale 5 may be provided. This belt-speed control system includes an encoder 65 that detects the number of revolutions of the rotating shaft of the belt drive motor 7. Moreover, a belt-speed-control switching unit may be provided. The belt-speed-control switching unit switches to a control for the belt speed that is performed by the belt-speed control system, and controls the number of revolutions of the belt drive motor 7, when the scale-mark degradation determining unit determines the degradation of the predetermined value or more, by making the rotation of the intermediate transfer belt 10 continue. In this case, the belt-speed-control switching unit function is performed by a control unit 70' that includes a microcomputer, in the same manner as by the control device 70 as explained with reference to FIG. 1.

The degradation of the predetermined value or more indicates a case where a scratch or dirt wider than the seal 8 of FIG. 4 in the direction of belt movement is formed in the slit portion 5*a,* or a case where a large number of fine stains are deposited in the slit portion 5*a*. Even in such cases, by providing the belt-speed control system using the encoder 65 and the belt-speed-control switching unit, it is possible to continue rotation of the intermediate transfer belt 10. Consequently, there is no interruption in the image forming process.

In this case, the image forming operation is complete after the intermediate transfer belt 10 is cleaned each time one image formation job is complete, and the belt speed control by the belt-speed control system using the encoder 65 is reset. If any stain has not been removed yet from the slit portion 5*a* upon starting the next image formation job, the control is switched again to the belt speed control by the belt-speed control system using the encoder 65. If the number of times of switching to the belt speed control using the encoder 65 reaches the predetermined number or more, the display portion 75 is made to display a message to replace the intermediate transfer belt 10.

A method of detecting degradation of the scale is explained below. This method uses any measure other than the number of reference pulses and the frequency as explained with reference to FIG. 9.

In this method, the sensor 6 detects a slit portion 5*a* of the scale 5 and outputs pulses to determine how the scale 5 is degraded based on a period T of the pulses. In other words, how the period T as shown in FIG. 7 fluctuates due to a fluctuation in load to the intermediate transfer belt 10, is previously measured. A threshold value of the period is set to determine the degradation of the scale 5 from the result of measurement, and the threshold value is stored in the motor controller 73 (FIG. 3) of the control device 70.

For example, based on the result of measurement, if it is found that the period T fluctuates ±5% due to a fluctuation in load, the threshold value to determine degradation of the scale 5 is specified as $T\times(1\pm 5/100)$, and this threshold value is stored in the motor controller 73.

The fluctuation in load mentioned here indicates a fluctuation in load applied to the belt speed by equipment such as a roller in direct contact with the intermediate transfer belt 10.

If a portion in which the occurrence period of pulses is a short period equal to or less than the threshold value upon driving of the intermediate transfer belt 10, then it is determined that the frequency in that portion fluctuates because of the scratch. If such portion is detected, the control device 70 performs the seal correction to drive the belt drive motor 7 so that the belt speed is controlled to a basic speed.

If the scale 5 has no degradation due to the scratch, the occurrence period of pulses does not become equal to or less than the threshold value. Furthermore, if the load to the intermediate transfer belt 10 does not fluctuate, the occurrence period of pulses is T and becomes constant. In this case, the seal correction is not performed.

The number of times of the seal correction is performed is stored. When the count reaches or crosses the specified number, the display portion 75 is made to display an alarm in the same manner as explained above.

According to the belt device, the image forming apparatus using the same, and the belt speed control method of the present invention, when the scale on the belt is degraded due to wearing, a scratch, or is stained with toner, the scale-mark degradation determining unit detects the degradation to correct the belt speed and to obtain an accurate belt speed. Therefore, even if the scale is slightly degraded, it is possible to keep the belt speed stable and accurate.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A belt device comprising:

a scale that includes a plurality of scale marks formed thereon;

a belt as an endless belt, with the scale formed along its whole circumference;

a sensor that reads the scale to obtain scale information, wherein an actual belt speed of the belt, detected based on the scale information read, is used to correct a belt speed of the belt;

a scale-mark degradation determining unit that determines whether the scale mark is degraded; and a belt drive controller that continuously provides control to correct the belt speed for a degraded portion of the belt, until the scale-mark degradation determining unit determines that there is no degradation.

2. The belt device according to claim 1, wherein an output pulse is output whenever necessary, and is used for detecting degradation of the scale;

the sensor outputs an output signal at a timing at which a number of the output pulses for detecting degradation reaches a preset number of reference pulses; and the scale-mark degradation determining unit determines the occurrence of the degradation in any one case chosen from a group consisting of a case when an output signal is not output by the sensor, and a case when an output signal, similar to the output signal from the sensor, is output before a number of the reference pulse reaches the preset number of output pulses.

3. The belt device according to claim 1, wherein the scale-mark degradation determining unit determines the degradation by comparing a frequency of an output value, output by the sensor while reading the scale, with a preset reference frequency.

4. The belt device according to claim 1, further comprising:

a belt-drive stop controller that stops rotation of the belt if the scale-mark degradation determining unit determines the degradation having a value more than a predetermined value.

5. The belt device according to claim 4, further comprising:

a display unit that causes a display portion to display an alarm, if the belt-drive stop controller stops the rotation of the belt.

6. The belt device according to claim 1, further comprising:

a belt-speed control system that performs belt speed control without using the scale information read; and a belt-speed-control switching unit that switches to the belt speed control performed by the belt-speed control system, to continue rotation of the belt if the scale-mark degradation determining unit determines the degradation having a value more than a predetermined value.

7. The belt device according to claim 1, further comprising:

a display unit that causes a display portion to display an alarm if a count crosses a specified number, wherein the display unit stores a number of times the belt speed correction is performed for the degraded portion of the belt, as the count.

8. An image forming apparatus comprising:

a belt device that includes a scale that includes a plurality of scale marks formed thereon;

a belt as an endless belt, with the scale formed along its whole circumference;

a sensor that reads the scale to obtain scale information, wherein an actual belt speed of the belt, detected based on the scale information read, is used to correct a belt speed of the belt;

a scale-mark degradation determining unit that determines whether the scale mark is degraded; and a belt drive controller that continuously provides control to correct the belt speed for a degraded portion of the belt, until the scale-mark degradation determining unit determines that there is no degradation; and a plurality of photosensitive elements that individually carry toner images of different colors, and that are made to rotate, wherein the toner images of the different colors formed on the photosensitive element are sequentially transferred to the belt in a superimposed manner.

9. A belt speed control method of performing belt speed control using a belt device, comprising:

detecting an actual belt speed of a belt of the belt device, based on scale information read by a sensor;

a first correcting including correcting a belt speed of the belt based on the actual belt speed detected;

determining whether a scale mark on the belt is degraded;

a second correcting including correcting the belt speed for a degraded portion of the belt to rotate the belt at a preset basic speed, if degradation is determined; and continuing the second correcting until it is determined that there is no degradation, wherein the belt device includes a scale that includes a large number of scale marks formed thereon;

the belt as an endless belt with the scale formed along its whole circumference;

the sensor that reads the scale; and a scale-mark degradation determining unit that determines whether the scale mark is degraded.

* * * * *